Nov. 29, 1949     F. TAMBORELLO     2,489,833

DRY SHAVER TRANSMISSION

Filed June 25, 1945

INVENTOR.
Frank Tamborello
BY
Morsell & Morsell
ATTORNEYS.

Patented Nov. 29, 1949

2,489,833

UNITED STATES PATENT OFFICE 2,489,833

DRY SHAVER TRANSMISSION

Frank Tamborello, Milwaukee, Wis.

Application June 25, 1945, Serial No. 601,513

2 Claims. (Cl. 74—129)

1

This invention relates to improvements in dry shavers.

Dry shavers of the type now on the market usually have a fixed, slotted face-engaging part formed of extremely thin metal, with a slotted reciprocating cutter positioned against the inner surface of the face engaging part. In order to provide an efficient shaving action, the cutter must be reciprocated at high speed. Heretofore an electric motor housed within the handle has been used to actuate the cutter. The use of an electric motor, however, requires that a suitable source of electric current be available, and this is not always the case. Furthermore, electric motors get out of order requiring repair or replacement.

It is recognized that attempts have heretofore been made to provide a construction wherein a relatively slow reciprocation of the blade of a "Gillette" type of razor is produced manually in order to provide a shearing action. In these devices, however, the hand actuated motor has caused rotation of the drive shaft first in one direction and then in the opposite direction. This type of construction is entirely unsuited for driving the cutter of a modern type of dry shaver head at the high speed required.

It is a general object of the present invention to provide a hand-actuated dry shaver of the type having a reciprocating cutter member wherein there is mechanism for producing high speed operation with a minimum amount of manual effort.

A further, more specific object of the invention is to provide a device as above described, wherein the actuating lever is responsive to a squeezing action of the hand holding the dry shaver, there being means inside of the handle for transforming the reciprocal motion created by the action of the hand into continuous high speed, uni-directional rotary movement, the rotary movement in turn being used to provide for high speed reciprocation of the cutter.

A further, and more specific object of the invention is to provide a dry shaver as above described wherein the hand lever causes reciprocation of spaced actuating bars having reversely pivoted dogs which are engageable with opposite sides of a ratchet wheel, one of the dogs being effective in one direction of movement of the handle to cause partial rotation of the ratchet wheel, and the other dog being effective when it is moved in the opposite direction to cause continued partial rotation of the ratchet wheel in the same direction.

2

Other objects of the invention are to provide a dry shaver which is relatively simple and inexpensive in construction, which is efficient in operation, which is easy to opera'e, which is neat in appearance, and which is otherwise well adapted for the purpose described.

With the above and other objects in view, the invention consists of the improved dry shaver, and all of its parts and combinations, as set forth in the claims, and all equivalents thereof.

In the accompanying drawing, illustrating one complete embodiment of the preferred form of the invention, in which the same reference numerals designate the same parts in all of the views, Fig. 1 is a longitudinal sectional view through the improved dry shaver;

Fig. 2 is a fragmentary plan view of the ratchet wheel and operating members therefor on an exaggerated scale, parts being broken away and shown in section, and the dot-and-dash lines indicating an extreme position of movement of the operating members;

Fig. 3 is a sectional view taken on line 3—3 of Fig. 2; and

Fig. 4 is a fragmentary sectional view taken on line 4—4 of Fig. 2.

Referring more particularly to the drawing, the numeral 5 designates the handle or main body portion of the dry shaver which handle is hollow to provide an internal chamber 6 for the actuating mechanism. Suitably supported on the outer end of the handle is the shaving head 7. The head may be constructed in various ways and one conventional type of head has been illustrated. It includes a face engaging member 8 which is slotted as at 9 to provide openings for the reception of hair. The edges of the face engagement member have inwardly extending flanges which are connected to the base portion 10 of the head. The face engaging portion 8 is formed of extremely thin metal as is common in the art. The member is preferably open at its ends to slidably receive a cutter unit 11. The cutter unit includes a base 12 formed with a driving hole or slot 13. Connected to the base 12 to reciprocate therewith is a cutter member which is U-shaped in cross-section and which includes a part 14 formed of very thin metal. The part 14 is formed with a multiplicity of slots 15 as is standard practice. Hair which enters the slots 9 of the outer face engaging plate 8 projects into the slots 15 of the reciprocating cutter and is sheared as a result of the reciprocating movement. The above forms no part of the novelty of the present invention but has been described for purposes of clarity.

Slidably mounted in longitudinal openings 16 of guideway extensions 17 is a pair of parallel actuating arms 18. The outer ends of the arms project through the handle member 5 and are fixedly connected by an operating bar 19. A pin 20 has one end secured to the bar as at 21 and has its other end projecting slidably through a hole in the casing 5 and formed with a head 22. A coil spring 23 surrounds the pin 20 and is for the purpose of automatically returning the actuating arms 18 to the position of Fig. 1 after the bar 19 has been depressed by the action of the hand or fingers.

At the lower end of the left hand arm 18 is a laterally offset portion 24 (see Fig. 4) having a slot 25 extending therethrough. Pivoted on a pin 26 within the slot 25 is a dog 27. A band spring 28 normally urges the dog to the position of Fig. 2 where further movement is prevented by a shoulder 29.

The right hand actuating arm 18 also is formed with one of the laterally offset portions 24 having a slot 30. A dog 31 is pivoted in the slot 30 on a pin 32 and is normally urged by a band spring 33, to the position shown by full lines in Fig. 2 against a stop-shoulder 34. It is to be noted that the two dogs 27 and 31 operate in reverse directions from each other. The dog 27 can yieldingly pivot in a downward arc only from the position of Fig. 2, and the dog 31 can yieldingly pivot in an upward arc only.

The dogs 27 and 31 co-act with ratchet teeth 35 on the inner periphery of a ratchet ring 36. The ratchet ring is connected to a backing plate 37 in the manner illustrated in Fig. 3 and the backing plate has a central opening 38 through which a shaft 39 extends. The ends of the shaft 39 are suitably supported in the casing 5 and the backing plate, together with the ratchet ring 36 are rotatable around the shaft 39.

The outer periphery of the ratchet ring 36 is formed with gear teeth 40 which mesh with a pinion 41 rigidly mounted on a shaft 42. The shaft 42 is suitably journalled in the handle 5 and also carries rigidly thereon a bevelled gear 43 which meshes with a bevelled pinion 44 fixed to a shaft 45. The shaft 45 drives a gear 46 which is the first gear of a train of speed increasing gears. Gears 47 and 48 on a common shaft are driven by the gear 46. Gears 49 and 50 fixed to a common shaft are driven by the gear 48. Gears 51 and 52, fixed to a common shaft, are driven by the gear 50. Gears 53 and 54, fixed to a common shaft, are driven by the gear 52. Gears 55 and 56, fixed to a common shaft, are driven by the gear 54. The gear 56 meshes with a gear 57 on the inner end of a drive shaft 58. The latter has an eccentric pin 59 on its outer end which engages with the slot or opening 13 of the cutter 11 to cause rapid reciprocating movement of the cutter. Bearings for the various shafts in the train of gears may be formed by holes in partitions 60 or in any other desired manner.

In use of the improved shaver, the handle is grasped in the usual manner for dry shavers with portions of the fingers engaging over the operating bar 19. By alternately squeezing and releasing the fingers the actuating arms 18 are reciprocated. During the finger actuated inward stroke, the dog 27 engages one of the ratchet teeth 35 and as the arm moves from the full line position of Fig. 2 to the dot and dash line position therein, the dog will cause a rotating advance in the direction indicated by the arrow in Fig. 2. While this is occurring, the dog 31 on the other side of the ratchet ring will slip over the ratchet teeth against the tension of the spring 33.

The upward stroke of the actuating arms 18 is caused by the expansion of the spring 23. During this stroke the right hand dog 31 will be effective to cause continued rotation of the ratchet ring in the same direction as before. During this upward stroke the left hand dog 27 will slip over the ratchet teeth against the tension of the band spring 28. It is thus apparent that, regardless of whether the bar 19 is being moved inwardly or outwardly, the ratchet ring is always being rotated in the same direction to cause a continuous rotation of the engaged gears. If the direction of rotation were reversed on the up-stroke the attainment of the speed necessary in a dry shaver would not be possible.

The rotation of the ratchet ring is, of course, at a relatively slow speed. However, the train of gears multiplies this speed so many times before reaching the drive shaft 58 that the speed of rotation of the latter is extremely high. Thus, a reciprocating movement at high speed is imparted to the reciprocatory cutter 11. The speed of the latter is comparable to that produced by the electric motors now used in dry shavers.

Various changes and modifications may be made without departing from the spirit of the invention and all of such changes are contemplated as may come within the scope of the claims.

What I claim is:

1. Operating mechanism for use in a dry shaver having an elongated substantially hollow handle formed on one side with a pair of axially bored longitudinally spaced inwardly projecting bearing bosses comprising an operating member positioned exteriorly of said handle for engagement by the hand of a user, a pair of longitudinally spaced parallel arms fixed to and projecting from said hand engaging member and extending slidably through and supported by said bearing bosses, said arms projecting into the interior of said handle, spring means for urging said hand engaging member away from said handle, a rotatable ratchet wheel within the handle mounted for rotation on a transverse axis, a first dog pivotally connected to the inner end of a first one of said parallel arms and engageable with the teeth on one side of said ratchet wheel, stop means for limiting pivotal movement of said dog in a direction toward said operating member when said arm is moving inwardly and for permitting pivotal movement of said dog in a direction away from said operating member when said arm is moving outwardly, a spring mounted on said arm and urging said dog toward said stop means and into engagement with the teeth of said ratchet wheel, a second dog pivotally connected to the inner end of the other of said parallel arms and engageable with the teeth on the other side of the ratchet wheel from said first dog, stop means for limiting pivotal movement of the second dog away from said operating member when the arms are moving outwardly and for permitting pivotal movement of said second dog in a direction toward the operating member when said arms are moving inwardly, a spring mounted on said other arm and urging said second dog toward said stop means and into engagement with the teeth of said ratchet wheel, and speed increasing gearing driven by said ratchet wheel.

2. Operating mechanism for use in a dry shaver having a substantially hollow handle comprising an operating member positioned exteriorly of said handle for engagement by the hand of a user; a pair of parallel arms projecting from said hand engaging member and extending slidably into the interior of said handle; spring means for urging said hand engaging member away from said handle; a rotatably supported ring gear within the handle, said ring gear being formed with internal ratchet teeth; a first dog pivotally connected to the inner end of the first one of said parallel arms and engageable with the internal ratchet teeth on one side of said ring gear; stop means for limiting pivotal movement of said dog in a direction toward said operating member when said arm is moving inwardly and for permitting pivotal movement of said dog in a direction away from said operating member when said arm is moving outwardly; a spring mounted on said arm and urging said dog toward said stop means and into driving engagement with the teeth of said ratchet wheel; a second dog connected to the inner end of the other of said parallel arms and engageable with the teeth on the other side of the interior of the ring gear from said first dog; stop means for limiting pivotal movement of the second dog away from said operating member when the arms are moving outwardly and for permitting pivotal movement of said second dog in a direction toward the operating member when said arms are moving inwardly; a spring mounted on said other arm and urging said second dog toward said stop means and into driving engagement with the internal ratchet teeth of said ring gear; and speed increasing gearing driven by said ring gear.

FRANK TAMBORELLO.

REFERENCES CITED

The following references are of record in the file of this patent:

UNITED STATES PATENTS

| Number | Name | Date |
| --- | --- | --- |
| 25,132 | Mitchell | Aug. 16, 1859 |
| 128,240 | Morton | June 25, 1872 |
| 630,899 | Knopf | Aug. 15, 1899 |
| 1,080,637 | Kenworthy | Dec. 9, 1913 |
| 2,178,976 | Te Pas | Nov. 7, 1939 |
| 2,252,156 | Bell | Aug. 12, 1941 |
| 2,311,552 | Law | Feb. 16, 1943 |